Figures 1, 2:
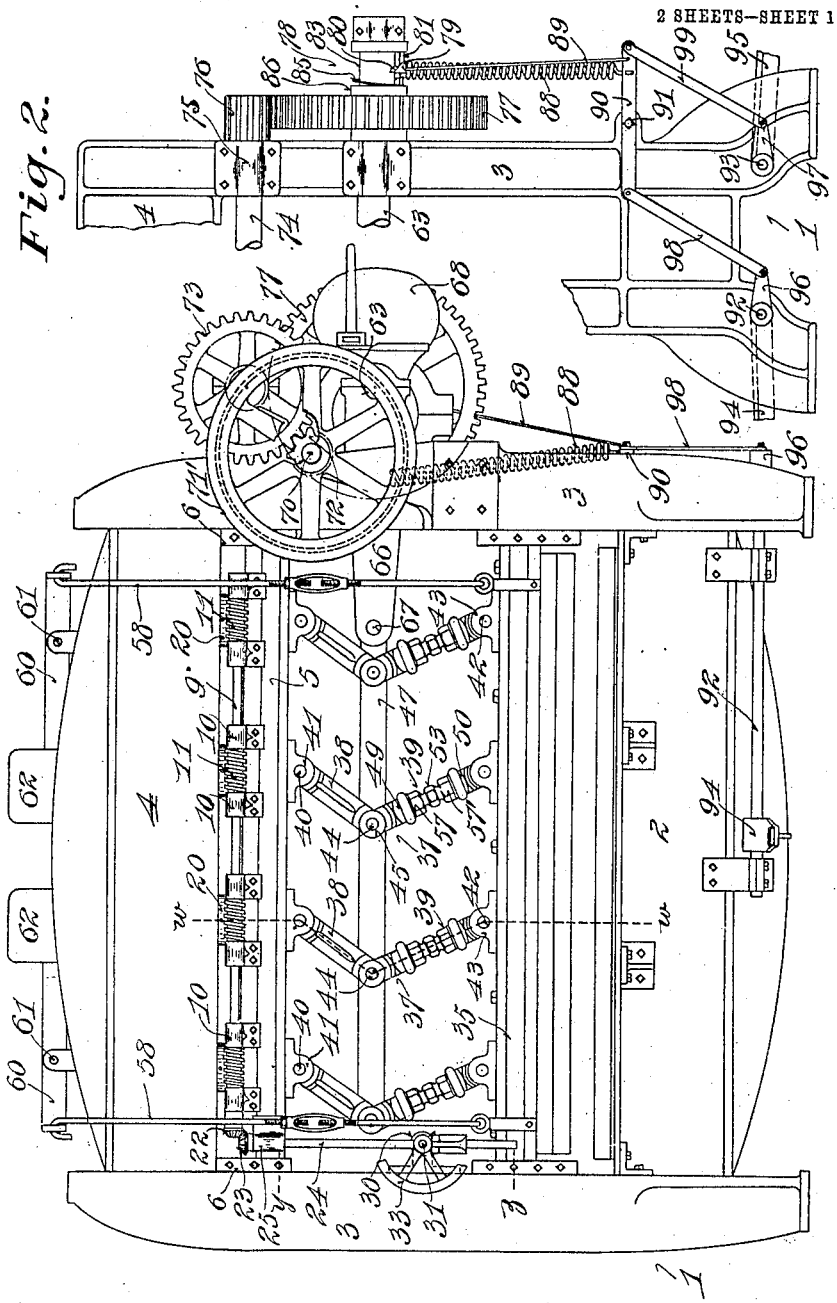

No. 848,203. PATENTED FEB. 5, 1907.
C. N. FREY.
TOGGLE PRESS.
APPLICATION FILED JULY 23, 1906.

2 SHEETS—SHEET 1.

Witnesses.
Henry N. Bauer
Cordelia O'Hearn

Inventor.
Clarence N. Frey,
by R. H. Hatzfeld, His Attorney

No. 843,203. PATENTED FEB. 5, 1907.
C. N. FREY.
TOGGLE PRESS.
APPLICATION FILED JULY 23, 1906
2 SHEETS—SHEET 2.
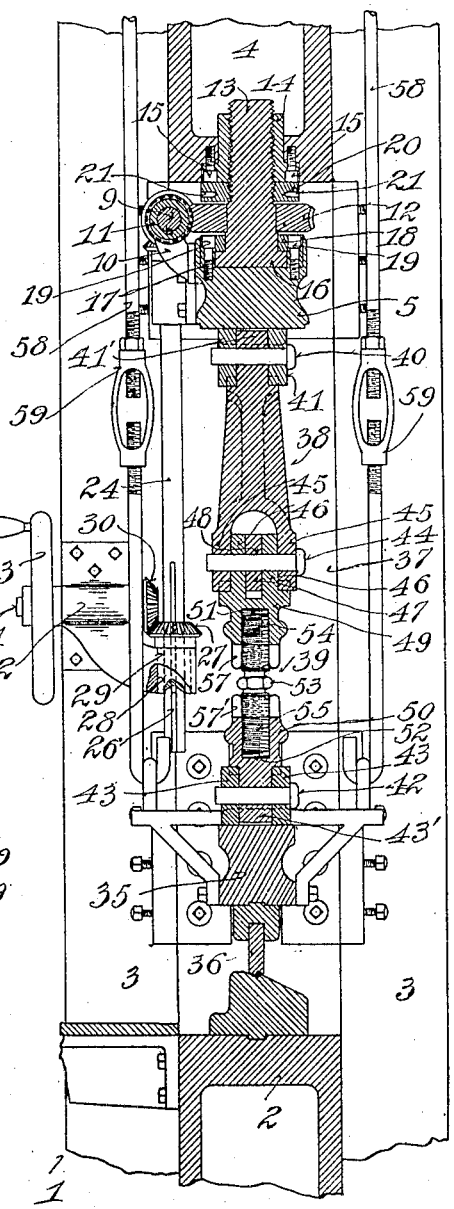
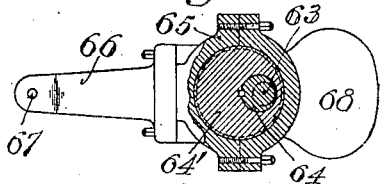
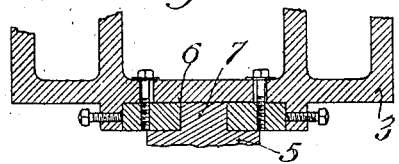
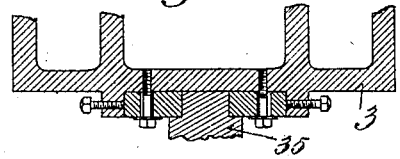
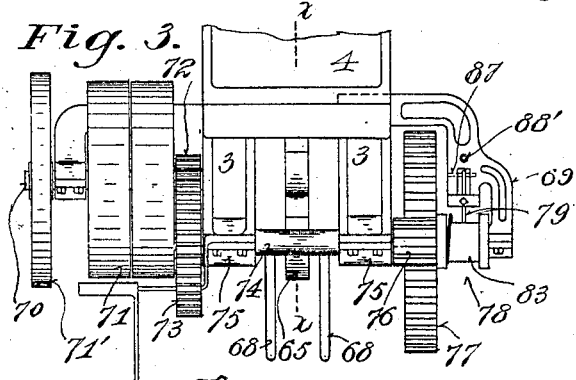
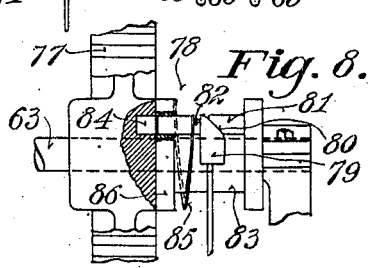
Witnesses.
Inventor.

UNITED STATES PATENT OFFICE.

CLARENCE N. FREY, OF CINCINNANTI, OHIO, ASSIGNOR TO THE J. M. ROBINSON MANUFACTURING COMPANY, OF CINCINNATI, OHIO, A CORPORATION OF OHIO.

TOGGLE-PRESS.

No. 843,203.  Specification of Letters Patent.  Patented Feb. 5, 1907.

Application filed July 23, 1906. Serial No. 327,332.

*To all whom it may concern:*

Be it known that I, CLARENCE N. FREY, a citizen of the United States, residing at Cincinnati, in the county of Hamilton and State of Ohio, have invented certain new and useful Improvements in Toggle-Presses, of which the following is a specification.

My invention relates to toggle-presses of the kind employed in bending metal, and has for its object the providing of new and useful improvements in machines of this character, and the invention will be readily understood from the following description and claims and from the drawings, in which latter—

Figure 1 represents a side elevation of my improved device. Fig. 2 is an end elevation of the machine, partly broken away, showing the manner of manipulating the clutch. Fig. 3 is a plan view of the driving mechanism. Fig. 4 is a cross-section taken on the line $w\ w$ of Fig. 1, showing the adjusting connections between the main bridge-piece, the supplemental bridge-piece, and the plunger, the toggle-levers being shown in distended relation. Fig. 5 is a sectional detail of the eccentric-drive for the toggle-bar, taken in section on the line $x\ x$ of Fig. 3. Fig. 6 is a detail in section on the line $y$ of Fig. 1, showing the slideway for the supplemental bridge-piece. Fig. 7 is a detail in section on the line $z$ of Fig. 1, showing the slideway for the plunger; and Fig. 8 is a detail of the clutch.

1 represents the frame of the machine, which comprises a lower die-bed 2, end uprights 3, and an upper bridge-piece 4.

5 is a supplemental bridge which is slidable at each end thereof in a guideway 6 of the end standards 3 by having a tongue 7 thereon taking into and guided by said guideway. The supplemental bridge is adjustable relatively to the upper or main bridge-piece for adjusting the distance between them and locating the supplemental bridge-piece vertically in the machine. Thus there is a shaft 9 extending longitudinally of the supplemental bridge and journaled in bearings 10 thereon. The shaft is provided with a series of worms 11, secured thereto, which mesh with worm-wheels 12, secured to adjusting-screws 13, distributed throughout the length of the supplemental bridge and preferably located vertically above the toggle-levers hereinafter described. Each of these screws is threaded into a nut 14, secured to the main bridge, as by bolts 15. Each of the screws also has a head 16, journaled in a bearing 17, formed by a cap 18, secured to the supplemental bridge, as by bolts 19. A jam-nut 20 takes about the screw and is arranged to jam against the nut 14 for rigidly holding the screws in adjusted position after adjustment, the jam-nuts being operated by means of a pin-wrench taking into apertures 21 therein. The shaft 9 carries a bevel-gear 22, with which a bevel-gear 23 is adapted to engage, the latter bevel-gear being on a vertical shaft 24, journaled in a bearing 25 on the supplemental bridge and movable therewith and having spline connection 26 with a bevel-gear 27, whose hub 28 is journaled in a bearing 29 on the machine, a bevel-gear 30 meshing with the bevel-gear 27 and being on a shaft 31, journaled in a bearing 32 and having a hand-wheel 33 for operating the same. Upon the raising or lowering of the supplemental bridge the shaft 24 slides relatively to the bevel-gear 27, but maintains its rotative connection therewith by means of its spline connection. The turning of the hand-wheel will operate all of the adjusting-screws 13 simultaneously for raising or lowering the supplemental bridge-piece to equal extent throughout all points of its length.

35 is a plunger to which an upper die 36 may be secured. Toggle-levers 37 are located between the supplemental bridge and the plunger for operating the latter. These toggle-levers comprise an upper member 38 and a lower member 39, the upper members being pivoted to the supplemental bridge on pins 40 in bearings 41, located vertically below the screws 13, the lower members being pivoted to the plunger by pins 42 in bearings 43 and said members being pivoted together by pins 44 in bearings 45 46 of the respective upper and lower members. A toggle-bar 47 has a bearing 48 for each of said pins 44 for straightening out and buckling the toggle-levers. One of the members of said respective toggle-levers is preferably made adjustable, as by having its pivoted end pieces 49 50 reversely internally threaded, as shown at 51 52, into which a bolt 53, which is reversely threaded at its ends, as shown at 54 55, takes. Jam-nuts 57 57' are provided for firmly securing the parts in adjusted position. Through the medium of these toggle adjustments any part of the plunger may be given diverse pressure, depending on the stock that is in the machine or the character of the work being performed, it being understood that with different classes of work or different kinds of stock different pressure must be exerted upon the die.

For aiding in the normal raising of the plunger I provide each corner thereof with a hanger-rod 58, provided with a turnbuckle 59, and connect these hanger-rods with weight-levers 60, pivoted at 61 to the bridge-piece and provided with counterbalance-weights 62.

The toggle-bar is operated from a crank-shaft 63, having a crank 64 thereon, about which a second crank 64' is rigidly secured. A stirrup 65 of a toggle-link 66 is journaled about the crank or eccentric 64, the toggle-link connecting with the toggle-bar 47 by means of a pin 67. Weights 68 are rigidly connected to the crank-shaft and move therewith and counterbalance the eccentrics 64 and 64'.

70 is a driving-shaft driven by suitable means, as by a pulley 71. The driving-shaft also supports a fly-wheel 71'. A pinion 72 is on the driving-shaft and meshes with a gear 73 on a shaft 74, journaled in bearings 75 on the machine-frame. This latter shaft carries a pinion 76, meshing with a gear 77, journaled about the eccentric-shaft and releasably secured thereto by means of a clutch 78, the clutch having a step-by-step movement adapted to throw the eccentric-shaft out of driving connection with the source of power at the end of each stroke of the plunger. The clutch is thrown out of engagement by a dog 79, having an inclined face 80, making contact with a lug 81 on a lock-pin 82, sliding on the clutch-sleeve 83 on the cam-shaft, the said lock-pin making engagement with the walls of a recess 84 in the hub of the gear 77 and normally urged into said recess by a spring 85, secured to the flange 86 of the sleeve 83 and to the lock-pin for normally pressing said pin into engagement with the walls of said recess. The dog 79 is pivoted on a pin 87 (see Fig. 3) and when retracted releases the lug 81 for causing the lock-pin to slide into operative connection with the gear 77. The dog is normally pressed into the path of said lug by a spring 88, and it is depressed by a rod 89, pivoted to a lever 90, which is pivoted at 91 to the frame of the machine. The spring 88 is stretched between the outer end of the lever 90 and bolt 88' on the bracket 69. 92 93 are rock-shafts to which treadles 94 95, respectively projecting forwardly and rearwardly of the machine, are respectively secured, arms 96 97 being also secured to said rock-shafts, with links 98 99 pivotally connecting said respective arms with the respective ends of said lever 90. When either of said treadles is depressed, the dog 79 is retracted, the dog being immediately rethrown into the path of its lug upon release of the treadles, which latter respectively extend to front and rear of the machine for operating the latter from either side of the plunger.

In my improved device the pressure exerted along the plunger at any point longitudinally thereof may be regulated by means of the adjustment of the respective toggle-links, and simultaneous adjustment for pressure may be given to said plunger throughout its length by turning the hand-wheel 33 so that when the selective pressures at various points longitudinally of the plunger have been obtained the variation in total pressure may be obtained instantly without derangement of said selective pressures.

Having thus fully described my invention, what I claim as new, and desire to secure by Letters Patent, is—

1. In a toggle-press, the combination of a main frame comprising a main bridge-piece, a supplemental bridge-piece under said main bridge-piece, means between said bridge-pieces for simultaneously adjusting said supplemental bridge-piece throughout its length with relation to said main bridge-piece, a plunger, toggle-links between said supplemental bridge-piece and plunger, and means for separately adjusting the length of said respective toggle-links, substantially as described.

2. In a toggle-press, the combination with a main frame comprising a main bridge-piece of a supplemental bridge-piece, means between said main bridge-piece and supplemental bridge-piece acting upon said bridge-pieces at a plurality of points distributed throughout their lengths for adjusting the distance between said bridge-pieces simultaneously throughout their length, a plunger, toggle-links between said supplemental bridge-piece and plunger, a toggle-bar connected with each of said toggle-levers for simultaneously moving the same, and means for selectively adjusting the operative length of said respective toggle-levers.

3. In a toggle-press, the combination with a main frame comprising a main bridge-piece and a plunger, of toggle-levers between them, a toggle-bar for simultaneously operating said levers, means for separately adjusting the length of throw of said respective toggle-levers, and means for simultaneously adjusting the pivotal positions between said main bridge-piece and plunger of all of said toggle-levers.

4. In a toggle-press, the combination of a main frame comprising a main bridge-piece, a supplemental bridge-piece thereunder, a plurality of adjusting-screws distributed throughout the lengths of said bridge-piece and journaled in one of said bridge-pieces and having threaded connection with the other of said bridge-pieces, means for imparting coincident movement to all of said adjusting-screws, toggle-levers between said supplemental bridge-piece and plunger, and means for separately adjusting said toggle-levers, substantially as described.

5. In a toggle-press, the combination with the side standards, main bridge-piece and a plunger, of a supplemental bridge-piece having sliding connection with said standards, adjusting-screws having threaded connection with said main bridge-piece and journal connection with said supplemental bridge-piece, a worm-wheel on each of said adjusting-screws, worms meshing said worm-wheels, a cross-shaft on which all said worms are secured, means for turning said cross-shaft for simultaneously rotating said worms and adjusting-screws, jam-nuts for said adjusting-screws, toggle-levers between said supplemental bridge-piece and plunger, and means for separately adjusting said toggle-levers, said toggle-levers being located vertically below said adjusting-screws, substantially as described.

6. In a toggle-press, the combination of a main frame comprising a main bridge-piece, a supplemental bridge-piece, means between said bridge-pieces and contacting said bridge-pieces at a plurality of points distributed throughout their lengths for simultaneously adjusting said supplemental bridge-piece throughout its length toward or from said main bridge-piece, a plunger, toggle-links between said supplemental bridge-piece and plunger, and means for separately adjusting the lengths of said respective toggle-links, constructed and arranged for selectively simultaneously adjusting said collective toggle-levers or adjusting said toggle-levers separately, substantially as described.

7. In a toggle-press, the combination of a main frame comprising a main bridge-piece, a plunger, a supplemental bridge-piece and toggle-levers between said main bridge-piece and plunger, a toggle-bar for simultaneously operating said levers, means for separately adjusting the length of throw of said respective toggle-levers, and means for simultaneously adjusting the pivotal positions between said main bridge-piece and plunger of all of said toggle-levers, constructed and arranged for selectively simultaneously adjusting said collective toggle-levers or adjusting said toggle-levers separately, substantially as described.

In testimony whereof I have subscribed my name hereto in the presence of two subscribing witnesses.

CLARENCE N. FREY.

Witnesses:
HENRY N. BAUER,
CORDELIA O'HEARN.